B. O. FANSLOW.
CHECK PROTECTING MACHINE.
APPLICATION FILED JUNE 3, 1918.
1,333,105.
Patented Mar. 9, 1920.
3 SHEETS—SHEET 1.
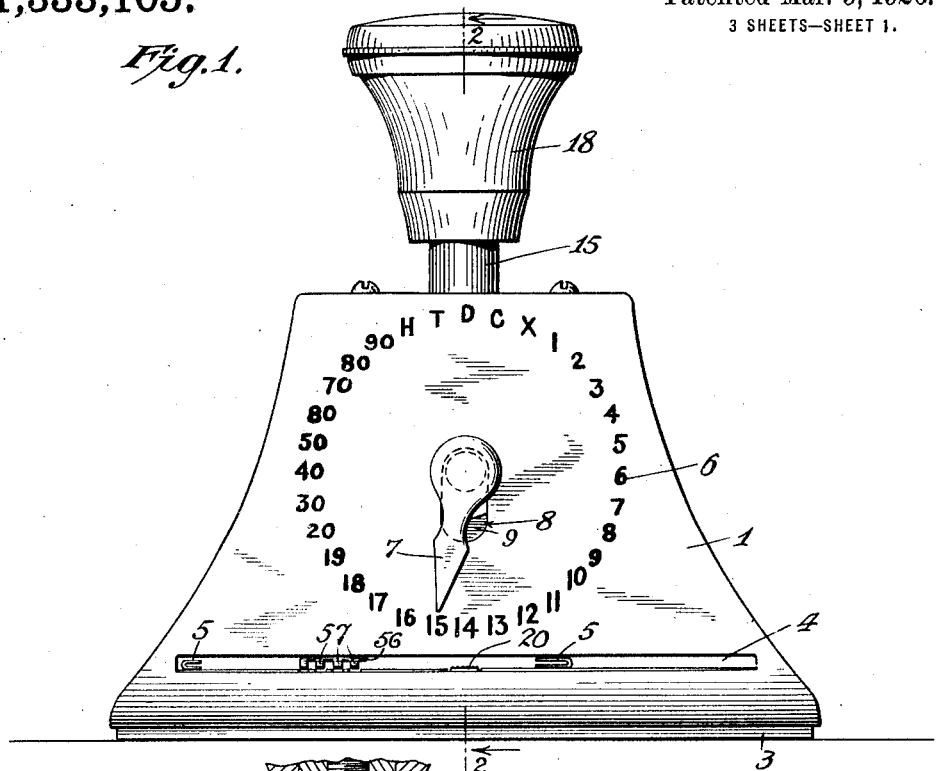
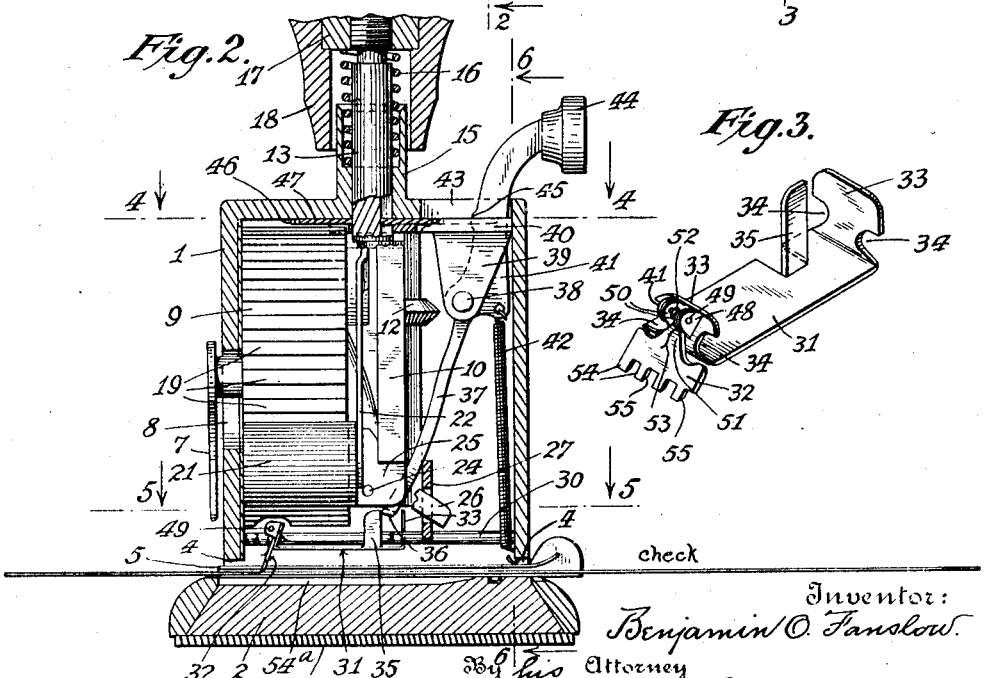
Inventor:
Benjamin O. Fanslow.
By his Attorney
Chas. M. Chapman.

B. O. FANSLOW.
CHECK PROTECTING MACHINE.
APPLICATION FILED JUNE 3, 1918.

1,333,105.

Patented Mar. 9, 1920.
3 SHEETS—SHEET 2.

Inventor:
Benjamin O. Fanslow.
By his Attorney
Chas. M. Chapman.

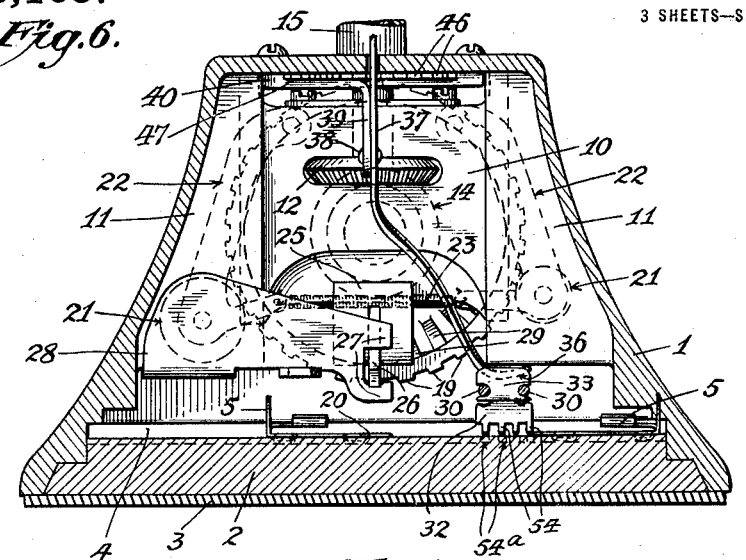

UNITED STATES PATENT OFFICE.

BENJAMIN O. FANSLOW, OF WHITE PLAINS, NEW YORK, ASSIGNOR TO NEW ERA MFG. CO., OF NEW YORK, N. Y., A CORPORATION OF NEW YORK.

CHECK-PROTECTING MACHINE.

1,333,105.      Specification of Letters Patent.      Patented Mar. 9, 1920.

Application filed June 3, 1918. Serial No. 237,966.

*To all whom it may concern:*

Be it known that I, BENJAMIN O. FANSLOW, a citizen of the United States, residing in White Plains, county of Westchester, and State of New York, have invented a new and useful Improvement in Check-Protecting Machines, of which the following is a description.

This invention relates to check protecting machines and, particularly, to the feeding mechanism, semi-automatic in character, for machines of the check writer type.

An object of the invention is to provide a check writer with a feeding mechanism which is semi-automatic in character, that is, said feeding mechanism is so constructed that it may be readily operated directly by the hand of the operator and wherein the time of operation is not in any way tied up to the manipulation of the printing wheel.

A further object of the invention is to provide a hand-operated feeding mechanism for a check writer with a gage member which is associated with the printing wheel and positioned thereby, and which operates to regulate the stroke of the hand feed.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a front elevation of a check protecting machine embodying my invention;

Fig. 2 is a section substantially on the line 2—2 of Fig. 1;

Fig. 3 is a detail perspective of the feed-slide and feed-dog;

Fig. 6 is a section substantially on the line 6—6 of Fig. 2; and

Fig. 7 is a view similar to Fig. 2 showing the feed controlling lever, slide and dog in a different position.

Figure 4:
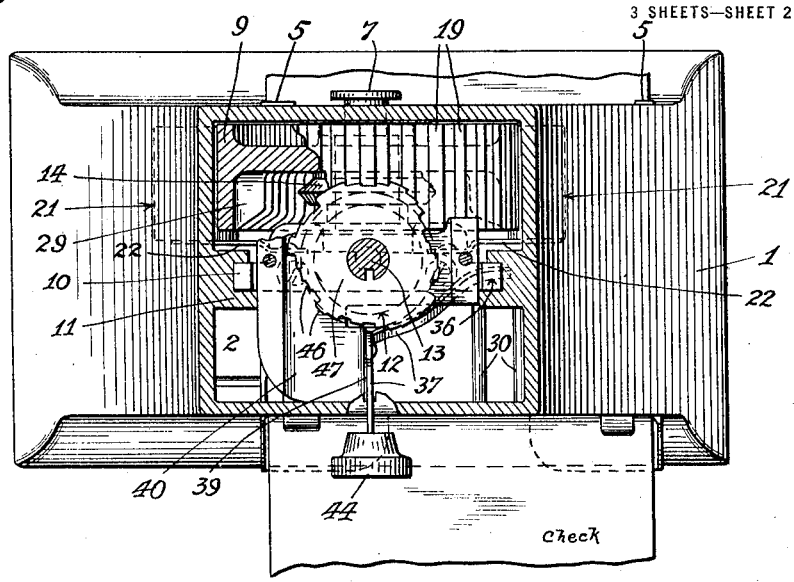
Fig. 4 is a section substantially on the line 4—4 of Fig. 2, the handle of the feed controlling lever, however, being shown in full.
Figure 5:
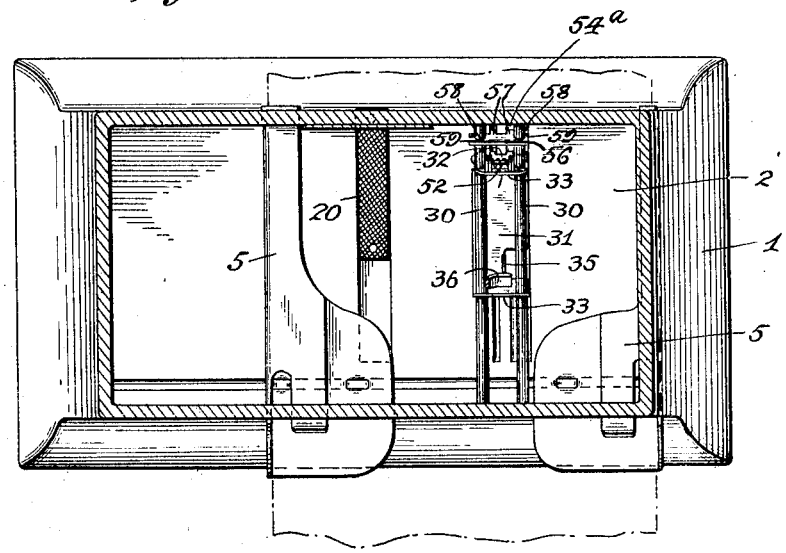
Fig. 5 is a section substantially on the line 5—5 of Fig. 2.

The invention broadly consists in a feeding mechanism for a check protecting machine, which feeding mechanism is operated directly by the hand of the operator. This feeding mechanism includes a reciprocating feed dog which is adapted to engage the check and feed the same through the machine. The feed dog is moved by means of a feed lever, and this feed lever extends through the casing of the machine and is provided with a hand manipulating member so that the feed lever may be moved in one direction by the hand of the operator. A spring is provided for moving said lever in the opposite direction. This hand manipulating member is preferably closely associated with the operating knob for the printing wheel so that the feed lever may be actuated by the same hand that is used to operate the printing wheel, thus making the machine that may be termed a one hand operated machine. The feed actuating lever is controlled by a rotary gage member which is connected to the mechanism for rotating the printing wheel, and this gage member is formed with projections varying in length to correspond to the length of the work being printed. These projections are adapted to limit the hand movement of the feed actuating lever and thus determines the stroke of the feed dog so that, while the feed lever is hand operated, the extent of movement of the feed lever is automatically controlled by the word being printed.

The invention will possibly be better understood by a more detailed reference to the drawings, which show one specific embodiment of the invention. In these drawings, the numeral 1 indicates the frame of the machine, 2 the bed thereof on the bottom of which a mat, pad or other sound deadening device 3 is applied. Between the bed and the bottom of the frame 1, slots 4, for the passage of the check from rear to front, are provided. On the bed within the slots 4 are set two check-guides 5 which are substantially U-shaped in cross-section and which are adjustable on the bed toward and from each other to enable the same to be set for the width of any check passed through the machine. The face of the frame is dialed, as at 6, with which coöperates a pointer 7, the hub of which operates in slot 8 in the face of the machine and which is connected to the printing-wheel 9, journaled in suitable manner upon the plunger or cross-head 10 guided in ways or lugs 11 of the frame. A bevel-gear 12 is carried by the plunger 10 and is adapted to rotate in a slot thereof, a spindle 13 being connected thereto so as to rotate the same, the said bevel-gear meshing with a similar bevel-gear 14, Figs. 4 and 6, adapted to rotate with, and to rotate, the printing-wheel 9. The spindle 13 passes through the sheath 15 of the frame 1, said sheath being provided with a socket for the reception of a coiled spring 16, the upper end of which engages a nut 17 screwed upon the upper end of the spindle 13, and which nut engages a handle 18 by which the spindle, plunger and printing-wheel are depressed, the spring 16 returning the parts to normal position. By twirling the handle, the spindle 13, bevel-gears 12 and 14, and printing-wheel 9 may be rotated whereby to set any one of the type-blocks 19 in functional position to coöperate with the platen 20 to print and macerate the check, the platen being set in the bed 2 in coöperative relation to the printing-wheel or the type-blocks thereof. Inking means are provided for inking the surface of the type-blocks, the same being shown, in Figs. 2, 6 and 7, to consist of inking rollers 21 each carried by a lever 22 pivoted to the plunger or cross-head 10 and drawn toward each other by a spring 23 whereby to normally maintain the printing rolls in contact with the type-blocks on the circumference of the printing-wheel. The printing-wheel, when in its upper, or normal position, shown in Figs. 2 and 7, may be freely rotated, so as to set any one of the several type-blocks 19 in position to coöperate with the platen. When the printing-wheel is depressed, however, for a printing operation, it is held locked from rotation by means of a locking lever fulcrumed at 24 to a split lug 25 carried at the bottom of the cross-head 10 and the rear end 26 of which extends between the prongs 27 of a bifurcated fixture 28 secured in suitable manner to the bottom of one of the ways 11. The forward end of the lever projects into the printing-wheel, which latter is provided with a plurality of circumferentially arranged lugs 29 for coöperation with said lever when the printing-wheel is depressed.

All the foregoing parts are, or may be, substantially the same as are illustrated in my application Serial No. 237,967 for check protecting machine filed of even date herewith, and further details are not herein set forth, since no claim is made to said parts in this case. A semi-automatic feeding mechanism is provided for variably feeding the check through the machine regulated or adjusted distances, the extent of the feed depending upon the position of a gage-member adapted to be set simultaneously with the setting of the printing-wheel for locating a predetermined type-block in position for a printing operation. The said feeding mechanism is shown in detail in Figs. 2 to 7, inclusive.

The frame of the machine, near its bottom and just above the bed, is provided with a pair of spaced apart, parallel bars or rods 30 extending between, and supported by the back and front of the machine. Said bars support a feed-slide 31, see Fig. 3, upon which is mounted a feed-dog 32. The feed-slide is provided at its opposite ends with a pair of vertically extending lugs 33, each of which is provided in its opposite sides near the body of the slide with a recess 34 in which the bars 30 are received whereby the feed-slide is supported on the bars, is adapted to slide thereon, and is held by said bars firmly in parallelism with the bed of the machine. The slide 31 is provided with a vertical bar or lug 35, near its rear end, parallel with, and spaced from, the rear end lug 33 of the slide, the two providing a space between them for the operation of the lower curved end 36 of the feed-lever 37, fulcrumed at 38 to the depending ear 39 of a plate or fixture 40 secured in any suitable manner to the top of the frame of the machine. The feed-lever, about its fulcrum, is enlarged at 41 and to the enlargement is hooked the upper end of a spring 42, the lower end of which is secured to the back of the frame near its bottom. The enlarged part 41 of the feed-lever is extended through a slot 43 in the top of the frame, and at its outer end is provided with a knob or thumb-piece 44 by which the same may be manipulated. At the point where the lever passes through the frame-slot 43, it is provided with a projection 45 adapted to coöperate with any one of a plurality of shoulders or projections 46 provided on the periphery of a circular gage-member 47 held upon the fixture 40 by, and splined to, so as to rotate with, the spindle 13. As shown in Figs. 4 and 6, the feed-lever 37 is curved and offset so as to avoid interference with other parts of the machine and to enable its lower actuating end 36 to be extended between the lugs 33 and 35 at the rear end of the feed-slide, as clearly shown in Figs. 2, 6 and 7. At its forward end, the feed-slide 31 has the ears 48 extended from the forward lug 33 and in said ears the feed-dog 32 is pivoted, the pivot-pin 49 passing through the ears 48 and corresponding ears 50 projecting from the upper extension or narrow portion 51 of the feed-dog. To hold the feed-dog properly in position with a normal tendency to lie against the lug 33, a coiled spring 52 encircles the pivot-pin 49 and is connected thereto, and has one end, as at 53, bearing upon the feed-dog 32. Thus, the feed-dog may yield toward the front of the machine to enable the check to be slid through the machine into proper position and also when the feed-slide 31 is driven toward the rear of the machine, so as to avoid drag upon the check. When, however, the feed-slide is driven forward toward the front of the machine, the feed-dog, under the impulse of its spring 52, will lie against the lug 33 and firmly engage the paper and feed the same positively through the machine. To enable the feed-dog to properly engage the surface of the check, its prongs 54 are beveled on their bottom, as at 55, producing thereby a fairly sharp edge at their extreme ends which frictionally and firmly grip or engage the surface of the check to positively feed the same when required. The beveled bottom of the tongues permits the feed-dog to slide over the paper, or the paper to slide forwardly past the feed-dog without retardation or drag. The bed of the machine, beneath the feed-slide, is provided with ridges and grooves 54$^a$, extending from rear to front of the machine, and adapted to coöperate with the prongs 54 of the feed-dog 32, the prongs overhanging the grooves and tending to press the check therein so as to obtain a firm grip or engagement and positively feed the check. To prevent the check from being retrieved or dragged backwardly by the feed-dog after the feeding operation, a detent is provided consisting of a blade 56, the executive edge of which is pronged, as at 57, and which is supported by the parallel bars 30 at their forward ends in advance of the feed-dog, said bars being provided with circumferential grooves 58 for receiving the opposite walls of slots 59 in the upper end of the detent. By this means the detent is enabled to yield slightly toward the front of the machine to permit the check to pass when it is inserted in the machine and during the operation of the feed-dog to feed the same. The prongs of the detent normally rest upon the surface of the check or upon the bed and coöperate with the ridges and grooves of the latter similarly to the prongs of the feed-dog. The detent prongs are formed in the same manner as the prongs of the feed-dog, and the normal position of the detent is such that any attempt to draw the check rearwardly or alter its position in the machine by a rearward movement will cause the detent to grip the check and hold the same. The shoulders or projections 46 on the gage-member 47 are of varying degrees of prominence corresponding, respectively, to the length of the words or indicia on the type-blocks of the printing-wheel; and the gage-member is so set on the spindle 13, relatively to the type-blocks on the printing-wheel, that the proper projection or shoulder on the gage-member will be in position to engage the projection 45 of the feed-lever to enable the feed-slide to properly feed the paper correspondingly with the length of the word on the type-block which is in printing position, plus the space between the printed word and the next one to be printed. Hence, when the printing-wheel 9 is twirled, the gage-member will be correspondingly twirled or rotated, and, when the proper type-block is set in functional or printing position preparatory to a printing operation, as indicated by the pointer and dial, the proper and corresponding shoulder or projection 46 on the gage-member will be set in position to be engaged by the projection 45 on the feed-lever 37.

With the foregoing details of construction clearly in mind, the following mode of operation will be readily understood:

A check is slipped into the machine between the check-guides 5, which have been properly set on the bed to receive the same and engage its opposite edges. The check is slid forward the proper distance through the check-guides, the feed-dog and detent, normally in position at the front of the machine, Fig. 5, yielding to the passage of the check. A combined presser and stripper, not shown, may be employed to hold the check upon the bed and prevent it from following the printing-wheel in its upward movement. The handle 18 is now twirled, resulting in turning the spindle 13, bevel-gears 12 and 14, printing-wheel 9 and pointer 7, the latter indicating when the proper type-block on the printing-wheel has been set in printing or coöperative relation to the platen 20. The handle 18 is now struck a sharp blow which drives the spindle 13, cross-head 10, and printing-wheel 9 downwardly, so that the type-block, which is in printing position, will strike the surface of the paper and drive the same against the platen 20, the printing couple,—type-block and platen,—thus printing the surface of the check and macerating its fiber, the latter quickly absorbing the ink on the surface of the type-block. During the downward movement of the parts, the locking lever is likewise carried downwardly, the rear end 26 of said lever engaging one of the lugs of the bifurcated fixture 28, thus causing its forward end to dip and enter between a pair of lugs 29 on the inner circumference of the printing-wheel. Under the expansive force of the spring 16, the said parts will be returned to normal position, and the locking lever will be lifted from engagement with the printing-wheel. The paper should now be fed a distance corresponding to the length of the word printed plus the space between the same and the next word to be printed, and, to provide for this proportional feed of the check, the gage-member 47 was set when the printing-wheel was set. Consequently, the proper or corresponding shoulder 46 on the periphery of the gage-member extends across the slot 43 in the top of the frame and in position to be engaged by the projection 45 on the feed-lever. Hence, the said lever is now shifted until its projection 45 engages the gage-shoulder or projection in its path, resulting in shifting the feed-slide 31 rearwardly to the proper position preparatory to the feed operation, the detent holding the check. As the feed-slide is thus shifted rearwardly by the lower curved end 36 of the lever engaging the rear lug 33 of the feed-slide, the feed-dog yields vertically or circularly relatively to the check and forwardly toward the front of the machine, thus avoiding drag upon the check which would tend to retrieve the latter in the machine. When the lever is released, the spring 42 will throw its knob 44 to the position of Fig. 2, causing its lower actuating end to engage the lug 35 and drive the feed-slide forwardly. Immediately this action begins, the spring 52 forces the feed-dog 32 against the lug 33 making a rigid connection between the dog and slide and causing the dog to engage and slightly bite into the surface of the check coöperatively with the ridges and grooves on the bed, and positively feed the latter forwardly through the machine, the detent yielding at this time. It will thus be seen that the amount of feed movement imparted to the check depends upon the position toward the rear of the machine assumed by the feed-slide and feed-dog under the control of the lever 37, the movement of which in turn is controlled by the gage-shoulder or projection in the path of its movement in the slot 43. The forward feed movement of the dog and slide is always to the same point, regulated by engagement of the feed-lever with the rear wall of the frame. The spacing of the lug 35 relatively to the adjacent lug 33 provides for freedom of movement or lost motion in the swing of the feed-lever about its fulcrum 38. Hence, the rear throw of the feed-lever is variable or adjustable under control of the gage-member, while the movement forward of the feed-dog and slide is always to the same point or position. It will thus be seen that the gage-member 47 is the primary controlling means for the feeding device, and that the lever 37 is properly a feed-actuating and controlling lever.

Having thus described my invention, what I claim and desire to secure by Letters Patent is:

1. A check protecting machine comprising a printing-wheel adapted to rotate and reciprocate, a gage-member adapted to rotate, common means for producing the rotary movement of the gage-member and printing-wheel, a hand operated feed actuating lever adapted to coöperate with the gage-member during one of its movements and with a fixed part of the machine during another of its movements, a feed-slide engaged by the feed actuating lever, and a spring-controlled feed-dog carried by said feed-slide and directly engaging the check for feeding the same.

2. A check protecting machine comprising a printing-wheel adapted to rotate and reciprocate, a gage-member adapted to rotate and disposed at an angle to the printing-wheel, a hand operated feed actuating lever adapted to coöperate with the gage-member during one of its movements and with a fixed part of the machine during another of its movements, a feed-dog directly engaging the check for feeding the same, and means between the feed-dog and the feed actuating lever whereby the former may be actuated.

3. A feeding mechanism for check protecting machines comprising a pair of parallel bars, a feed-slide supported by said bars and adapted to reciprocate thereon, a feed-dog carried by the feed-slide directly engaging the check for feeding the same, means whereby the feed-dog may have movements independently of the feed-slide, a spring-controlled feed actuating lever having a manipulating handle, a gage-member adapted to coöperate with said lever, and means for shifting the gage-member so as to cause different parts thereof to engage the said lever.

4. In combination with the frame of a check protecting machine having a slot through the top thereof, a feeding mechanism comprising a gage-member confined to rotary movements, means for imparting said movements so that different parts of the said member may project across the said slot, a feed-dog directly engaging the check for feeding the same, and means for actuating the same comprising a feed actuating lever, a portion of which extends through the slot whereby to coöperate with said gage-member.

5. A feeding mechanism for check protecting machines comprising a feed-slide, a feed-dog pivotally connected to the feed-slide and directly engaging the check for feeding the same, a feed actuating lever coöperating with the slide, a hand manipulating member carried by said actuating lever, a rotary gage-member adapted to coöperate with the feed actuating lever at one extreme of movement of the latter, said gage-member having a plurality of variant projections, whereby the movement of the lever in one direction is controlled so as to control the point at which the feed-dog begins its feeding movement.

6. In combination with the frame of a check protecting machine having a slot therethrough, a gage-member located in coöperative relation to the slot so as to have a portion of its periphery extend across the same, means by which the gage-member may be operated, a feed-lever extending through the slot and having a manipulating member outside the frame and an actuating member within the frame, a feed-dog directly engaging the check for feeding the same and means between the feed-dog and the actuating member of the feed-lever, whereby movements may be imparted to the feed-dog, and a spring for controlling the initial position of the feed-lever and feed dog.

7. A feeding mechanism for check protecting machines comprising a reciprocating feed-slide, supporting means therefor confining the action of the slide to reciprocating movements, a feed-dog pivotally supported at one end of the slide and confined to movements thereon in the arc of a circle, said feed dog being adapted to directly engage the check and feed the same, a hand operated feed-lever coöperating with the feed-slide and means confining the same to oscillatory movements, a gage-member for coöperation with the feed-lever, and means confining said gage-member to rotary movements, and a spring for controlling the initial position of the feed-lever.

8. In combination with the frame of a check protecting machine having a slot therethrough, a feeding mechanism comprising a feed-dog adapted to reciprocate across the bed of the machine, said feed dog being adapted to directly engage the check and feed the same, means for supporting and guiding the feed-dog in its functional position, a feed-lever for actuating the supporting means pivotally supported at the top of the frame and extending through said slot, a gage-member also supported at the top of the frame and extending partially across said slot, and a spring for imparting the feed actuating movement to the feed-lever and for holding the latter normally out of contact with the gage-member.

9. A check protecting machine comprising a printing-wheel adapted to rotate and reciprocate, a gage-member, common means for producing the movement of the gage-member and printing-wheel, a hand operated feed actuating lever adapted to coöperate with the gage-member during one of its movements and with a fixed part of the machine during another of its movements, a feed-slide engaged by the feed actuating lever, and a spring-controlled feed-dog carried by said feed-slide and directly engaging the check for feeding the same.

10. A check protecting machine comprising a printing-wheel adapted to rotate and reciprocate, a gage-member disposed at an angle to the printing-wheel, a hand operated feed actuating lever adapted to coöperate with the gage-member during one of its movements and with a fixed part of the machine during another of its movements, a feed-dog directly engaging the check for feeding the same, and means between the feed-dog and the feed actuating lever whereby the former may be actuated.

11. In combination with the frame of a check protecting machine having a slot through the top thereof, a feeding mechanism comprising a gage-member, means for imparting movements so that different parts of the said member may project across the said slot, a feed-dog directly engaging the check for feeding the same, and means for actuating the same comprising a feed actuating lever, a portion of which extends through the slot whereby to coöperate with said gage-member.

12. A check protecting machine comprising a feed-slide, a feed-dog pivotally connected to the feed-slide and directly engaging the check for feeding the same, a hand operated feed actuating lever coöperating with the slide, a gage-member adapted to coöperate with the feed actuating lever at one extreme of movement of the latter, said gage-member having a plurality of variant projections whereby the movement of the lever in one direction is controlled so as to control the point at which the feed-dog begins its feeding movement.

13. A check protecting machine comprising a printing wheel, hand-operated means for moving said printing wheel up and down, a feeding mechanism having a feeding device for directly engaging the check and feeding the same, a hand-operated lever for actuating said feeding device, said hand-operated lever extending to a position adjacent the hand-operated means for the printing wheel whereby both the printing wheel and the feeding device may be manipulated by one hand of the operator.

14. A check protecting machine comprising a printing wheel, a gage member, means for simultaneously operating the printing wheel and gage member, a reciprocating feeding device for directly engaging the check for feeding the same, an actuating lever for actuating said feeding device, said actuating lever having a hand manipulating device whereby said lever may be directly engaged by the hand of the operator, said gage member being disposed so as to limit and determine the movement of the feed actuating lever by the hand of the operator, and a spring for returning said actuating member when released to a normal fixed position.

BENJAMIN O. FANSLOW.